Patented Nov. 28, 1933

1,936,588

UNITED STATES PATENT OFFICE 1,936,588

MANUFACTURE OF CELLULOSE ESTERS

Henry Dreyfus, London, England

No Drawing. Application July 23, 1930, Serial No. 470,229, and in Great Britain August 2, 1929

14 Claims. (Cl. 260—101)

This invention is a continuation in part of my prior U. S. application S. No. 321,750 filed 24th November, 1928, and relates to new or improved processes for the manufacture of cellulose acetates or other cellulose esters, for example cellulose propionate, cellulose butyrate, and the like.

In said U. S. application S. No. 321,750, I have described processes for the production of cellulose acetates or other cellulose esters by pretreating cellulosic materials with organic acids and esterifying in presence of ferric chloride or ferric bromide or mixtures thereof. In the processes of the parent specification the quantity of ferric chloride or ferric bromide used in the acetylation or esterification may vary widely, and the temperature at which the reaction may be effected without degradation of the cellulose molecule will vary with the particular quantity of catalysts selected. For example, with quantities of catalyst varying from 10–30% on the weight of the cellulose, it is preferable not to allow the reaction temperature to exceed 50° C., while with lower proportions of catalyst higher temperatures may safely be attained without seriously affecting the quality of the cellulose esters obtained. With very low quantities of ferric chloride, such as 1–2 or 3% the temperature may, for example, be carried to 50–75° C. or more.

According to the present invention the catalyst or catalyst mixture employed contains iron in a greater quantity than is equivalent to the chloride or other acid radicle present. Such a catalyst may be present throughout the whole esterification, or may be present during only a part of the esterification, for example during the latter part only.

The excess of iron above that chemically equivalent to the chloride or other acid radicle present may be introduced into the acetylating or esterifying mixture in any desired manner. For example, it may be introduced by direct addition of ferric oxide or ferric hydroxide, preferably freshly prepared, to the acetylating mixture, or to any constituent thereof prior to making up the mixture, the addition preferably taking place in the presence of ferric chloride or ferric bromide. Or alternatively, ferric chloride or ferric bromide already present in the mixture or in a constituent thereof may be partially or wholly neutralized as, for example, by the addition of a suitable alkali or other alkaline agent. The alkaline agent for the neutralization is preferably chosen so that no precipitation of iron is produced. As a further alternative the catalyst containing the excess of iron may be introduced as a whole into the acetylating mixture or a constituent thereof, for example in the form of a basic ferric halide.

The proportion of iron to chloride or other acid radicle may vary widely. For example, the chloride or other acid radicle may be present in an insignificant proportion relative to the iron, or may be present in a proportion almost equivalent to the iron, or any intermediate proportion may be used, for example a proportion of chloride or other acid radicle equivalent to half the iron present. Again, as in application No. 321,750, the total iron present may vary widely, for example, proportions of less than 1% or proportions of 2, 3, 5 or 10% up to 30, 40 or 50% or more on the weight of the cellulose may be used. The lower proportions, such as 20 or 15% or under, are in general preferable.

As initial materials for acetylation or other esterification according to the present invention, cotton or other celluloses or near conversion products may be employed, or wood pulps, bamboo, esparto, or other materials containing encrusting matter and from which the lignin, pentosan, resin and like constituents have been substantially removed, as in sulphite pulp, soda pulp or sulphate pulp or other chemical pulps. Chemical pulps are preferably subjected before esterification to an alkaline purifying treatment followed by a treatment with organic acids, as described in U. S. Patent No. 1,711,110. The alkaline purifying treatment may, for example, be effected with caustic alkali of low concentration, such as 3% or under, with heating or boiling, or with caustic alkali of relatively high concentration, such as 15 to 20%, in the cold or with only slight heating.

As in application No. 321,750, the cellulosic materials may be treated prior to esterification with organic acids. For example, they may be pretreated with concentrated or dilute acids, particularly lower aliphatic acids, e. g. formic and acetic acid, such acids being applied in small or large quantities, and in the liquid state in the cold or with heating or boiling, for example in the manner described in U. S. Patent No. 1,708,787, or in the state of vapours alone or mixed with inert gases, and in the cold or with heating, as described in U. S. application S. No. 66,103 filed 31st October 1925. After the treatment with organic acids the cellulosic materials may, if desired, be subjected to a stream of air or other inert gas, or to suction or vacuum to remove the organic acids wholly or partially. Formic acid, except when employed only in small quantities, should be substantially removed.

Another form of pretreatment which I have found effective is that described in U. S. applications S. Nos. 328,306 filed 24th December 1928 and 348,981 filed 21st March 1929. According to these specifications, the cellulosic materials are subjected to a pretreatment with hydrochloric acid, hydrobromic acid or hydriodic acid, or mixtures thereof in a quantity (calculated as hydrogen halide) not substantially exceeding 50% on the weight of the cellulose. Alternatively, halide salts and particularly ferric, stannic, cobalt, nickel, manganese and copper chlorides, may be employed for the pretreatment. The hydrohalide acids may be used in admixture with the halide salts, or a pretreatment with either or both may be applied in conjunction, i. e. simultaneously or separately, with a pretreatment with organic acids, and particularly lower fatty acids, for example acetic acid or formic acid. A pretreatment with ferric chloride or ferric bromide is of course especially valuable for the purpose of the present invention.

To obtain cellulose acetates or other cellulose esters of good quality the acetylation or esterification is preferably effected so that substantial degradation of the cellulose molecule does not occur. In the present invention, however, somewhat higher temperatures may be attained than is the case in prior U. S. application S. No. 321,750. Again, the reaction may, in some cases, be conducted at relatively low temperatures such as 20–30° C. in the first stages, and the temperature may be subsequently increased say up to 50, 75, or even 90° C. or more. Such a variation of the esterification temperature during the actual esterification may also take place in the case where the catalysts used in the first stages of esterification are those of the prior application referred to, and in which the whole or part of the chloride or other acid radicle is neutralized in the later stage.

According to a further modification of the invention, the early stages of the esterification may be effected in the presence of ferric chloride and hydrochloric acid or ferric bromide and hydrobromic acid or mixtures thereof, and at a later stage the hydrochloric or other acid may be neutralized, and at a still later stage or at the same time the whole or part of the chloride or other halide ion may be neutralized. In such a two or multi-stage process the temperature may vary with the individual stages, for example it may increase with decreasing acidity of the catalyst. Moreover the total amount of iron present may vary from stage to stage. The reaction may, for example, be started with small quantities of ferric chloride and hydrochloric acid, e. g. under 2% of each or up to 5% or 10%, and ferric oxide or hydroxide, preferably freshly prepared, be added from time to time. On the other hand, when starting with relatively large quantities of ferric chloride and hydrochloric acid a progressive neutralization may take place, by suitable addition of a neutralizing agent not containing tion.

As regards the other conditions of acetylation or esterification, reference is made broadly to the description of the prior application referred to. For example, as described therein the esterification may be effected so that the ester is produced in solution or may be effected in suspension in presence of a liquid diluent, or may be effected with the aid of vaporous esterifying agent, as described in U. S. application S. No. 72,403 filed 30th November, 1925.

The acetates or other esters produced may, if desired, be subjected to processes of secondary treatment or ripening for the purpose of changing their solubilities. Such processes are preferably conducted in presence of the catalysts used in the acetylation or esterification itself, but if desired, such catalysts may be separated and other ripening agents added. The ripening or further treatment may be effected at ordinary temperatures or with slight heating, but results of value are obtainable by heating the ripening mixture to relatively high or high temperatures, e. g. up to 80 or 100° C. or more. In the case of such relatively high or high temperatures free mineral acidity is preferably avoided or reduced to small proportions. For example, if the ripening is effected continuously with the acetylation or esterification as described above, the mineral acidity may already be sufficiently reduced, but additions of alkaline reagent may be made if desired. For example, sodium acetate may be added.

The acetates or other esters either as primary products or ripened, and in the primary esterification or ripening solutions or suspensions or after separation therefrom, may be worked up into commercial products, such as artificial silks, fibres, or films, moulding powders, thermoplastic masses, moulded articles, sheets, etc., and reference is made to the parent specification for a description of suitable methods of working up the products.

The following examples show the best methods known to me for carrying the invention into effect, but they are not to be considered as limiting the invention in any way:—

*Example 1*

100 parts of cotton linters are pretreated with formic acid, for example by treatment with 500 to 1000 parts or more of formic acid of about 85 to 100% strength, allowing to stand for 3 to 9 hours in the cold and hydro-extracting, or by impregnating with about 15 parts of formic acid of 75 to 85% strength and then allowing to stand for about 8 to 12 hours at ordinary temperature. If required the material may then be washed to remove the formic acid, centrifuged or dried. The pretreated material is then introduced into an acetylator containing a mixture of 600 parts of glacial acetic acid, 500 parts of acetic anhydride and 25 parts of crystallized ferric chloride, the reaction being allowed to proceed for about 2 to 3 hours under constant stirring at a temperature from ordinary atmospheric temperature to 30° C. At this stage 10 parts of freshly precipitated ferric hydroxide are added, and the acetylation then carried to completion at a temperature of 30 to 50° C. When solution is complete the cellulose acetate may be precipitated therefrom and further treated or worked up in any desired manner. Alternatively the further treatment or ripening may be effected directly in the acetylation solution. For this purpose hydrochloric acid may be added, for example in a proportion of 10 to 15 parts (calculated as HCl), and the ripening allowed to proceed at ordinary temperature, or alternatively the ripening may be effected at higher temperatures, e. g. at 80 to 100° C. without addition of hydrochloric acid. The reaction is arrested when acetone solubility is reached.

*Example 2*

100 parts of cotton linters are introduced in an acetylator into 400 parts of glacial acetic acid containing 20 parts of ferric chloride, and the whole allowed to stand at ordinary temperature for 4 to 6 hours with stirring. 400 parts of acetic anhydride are then added and acetylation conducted for a period of about 2 hours at a temperature of 30 to 40° C. At this stage 10 to 15 parts of freshly precipitated ferric hydroxide are stirred in and the reaction completed at a temperature of 50 to 65° C., until solution is complete. The cellulose acetate may then be ripened or otherwise worked up as desired.

*Example 3*

100 parts of cotton linters are sprayed with a mixture of 40 parts of glacial acetic acid and 15 parts of concentrated hydrochloric acid. The mass is allowed to stand at ordinary temperatures with occasional stirring for 3 to 6 hours. The cellulose thus pretreated is introduced into an acetylator containing 600 parts of glacial acetic acid and 400 parts of acetic anhydride. 5 parts of freshly precipitated ferric hydroxide and 5 parts of ferric chloride are then stirred in and acetylation conducted for 3 to 4 hours at 30 to 40° C. At this stage a further 15 parts of ferric hydroxide are added and the reaction completed at 50 to 70° C. The cellulose acetate may then be worked up as described in Example 1.

What I claim and desire to secure by Letters Patent is:—

1. In the manufacture of cellulose esters, the step of conducting at least part of the esterification of the cellulose in presence of a ferric halide catalyst containing iron in the ferric form in greater quantity than is equivalent to the halogen present in the catalyst.

2. In the manufacture of cellulose esters, the step of conducting at least part of the esterification of the cellulose in presence of a ferric chloride catalyst containing iron in the ferric form in greater quantity than is equivalent to the chlorine present in the catalyst.

3. In the manufacture of cellulose esters, the step of conducting part of the esterification of the cellulose in presence of ferric chloride and part in presence of a catalyst containing iron in the ferric form in greater quantity than is equivalent to the chlorine present in the catalyst.

4. In the manufacture of cellulose acetate, the step of conducting at least part of the acetylation of the cellulose in presence of a ferric halide catalyst containing iron in the ferric form in greater quantity than is equivalent to the halogen present in the catalyst.

5. In the manufacture of cellulose acetate, the step of conducting at least part of the acetylation of the cellulose in presence of a ferric chloride catalyst containing iron in the ferric form in greater quantity than is equivalent to the chlorine present in the catalyst.

6. In the manufacture of cellulose acetate, the step of conducting part of the acetylation of the cellulose in presence of ferric chloride and part in presence of a catalyst containing iron in the ferric form in greater quantity than is equivalent to the chlorine present in the catalyst.

7. Process of manufacturing cellulose acetate comprising pretreating cellulose with an acid reagent and then carrying out at least part of the acetylation of the cellulose in presence of a ferric chloride catalyst containing iron in the ferric form in greater quantity than is equivalent to the chlorine present in the catalyst.

8. Process of manufacturing cellulose acetate comprising pretreating the material consisting essentially of cellulose with hydrochloric acid and then carrying out at least part of the acetylation of the cellulose in presence of a ferric chloride catalyst containing iron in the ferric form in greater quantity than is equivalent to the chlorine present in the catalyst.

9. Process of manufacturing cellulose acetate comprising pretreating the material consisting essentially of cellulose with lower fatty acid and then carrying out at least part of the acetylation of the cellulose in presence of a ferric chloride catalyst containing iron in the ferric form in greater quantity than is equivalent to the chlorine present in the catalyst.

10. Process of manufacturing cellulose acetate comprising pretreating the material consisting essentially of cellulose with acetic acid and then carrying out at least part of the acetylation of the cellulose in presence of a ferric chloride catalyst containing iron in the ferric form in greater quantity than is equivalent to the chlorine present in the catalyst.

11. Process of manufacturing cellulose acetate comprising pretreating the material consisting essentially of cellulose with an acid reagent conducting part of the acetylation of the cellulose in presence of ferric chloride, adding freshly precipitated ferric hydroxide and finishing the acetylation.

12. Process of manufacturing cellulose acetate comprising pretreating chemical wood pulps with alkaline purifying agents, pretreating with an acid reagent, and effecting acetylation of the wood pulp by means of acetic anhydride, at least part of the acetylation being conducted in presence of a ferric chloride catalyst containing iron in the ferric form in a greater quantity than is equivalent to the chlorine present in the catalyst.

13. Process of manufacturing cellulose acetate comprising acetylating cellulose by means of acetic anhydride in presence of a ferric chloride catalyst containing iron in the ferric form in a greater quantity than is equivalent to the chlorine present in the catalyst, destroying excess of acetic anhydride and then subjecting the cellulose acetate to a ripening process.

14. Process according to claim 13, wherein hydrochloric acid is present in the ripening process.

HENRY DREYFUS.

CERTIFICATE OF CORRECTION.

Patent No. 1,936,588.  November 28, 1933.

HENRY DREYFUS.

It is hereby certified that error appears in the printed specification of the above numbered patent requiring correction as follows: Page 2, line 65, for "tion" read iron; and that the said Letters Patent should be read with this correction therein that the same may conform to the record of the case in the Patent Office.

Signed and sealed this 9th day of January, A. D. 1934.

F. M. Hopkins
Acting Commissioner of Patents.

(Seal)